United States Patent
Trantham et al.

(10) Patent No.: US 9,245,541 B1
(45) Date of Patent: Jan. 26, 2016

(54) STORAGE DEVICE WITH ADAPTIVE VOLTAGE GENERATION SYSTEM

(71) Applicant: Seagate Technology LLC, Cupertino, CA (US)

(72) Inventors: Jon Trantham, Chanhassen, MN (US); Todd Lammers, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/701,241

(22) Filed: Apr. 30, 2015

(51) Int. Cl.
  *G11B 5/00* (2006.01)
  *G11B 5/09* (2006.01)
  *G11B 5/48* (2006.01)
  *G11B 5/02* (2006.01)

(52) U.S. Cl.
  CPC .. *G11B 5/09* (2013.01); *G11B 5/02* (2013.01); *G11B 5/4853* (2013.01); *G11B 2005/0021* (2013.01); *G11B 2005/0024* (2013.01)

(58) Field of Classification Search
  None
  See application file for complete search history.

(56) References Cited

U.S. PATENT DOCUMENTS

| | | | |
|---|---|---|---|
| 5,994,885 A | 11/1999 | Wilcox et al. | |
| 6,157,182 A | 12/2000 | Tanaka et al. | |
| 6,178,055 B1 | 1/2001 | Janz | |
| 6,788,483 B1 | 9/2004 | Ferris et al. | |
| 7,038,870 B2 | 5/2006 | Suzuki et al. | |
| 7,859,236 B2 | 12/2010 | Weng et al. | |
| 8,330,445 B2 | 12/2012 | Herbst | |
| 8,582,226 B2 | 11/2013 | Tetzlaff et al. | |
| 2004/0212910 A1* | 10/2004 | Suzuki et al. | 360/68 |
| 2013/0286806 A1 | 10/2013 | Wessel et al. | |
| 2014/0029396 A1* | 1/2014 | Rausch et al. | 369/13.23 |

* cited by examiner

*Primary Examiner* — Wayne Young
*Assistant Examiner* — Brian Butcher
(74) *Attorney, Agent, or Firm* — Hall Estill Attorneys at Law

(57) ABSTRACT

Apparatus for generating supply voltages in a data storage device. In some embodiments, the apparatus includes a data transducer adjacent a rotatable magnetic recording medium, the data transducer having a write coil and an electromagnetic source for thermally assisted recording by the write coil. A preamplifier/driver circuit (preamp) has a write driver adapted to supply write currents to the write coil and a source driver adapted to supply source voltage to the electromagnetic source. A voltage regulation circuit applies a first positive supply voltage to the write driver and a different, second positive supply voltage to the source driver.

20 Claims, 4 Drawing Sheets

STORAGE DEVICE WITH ADAPTIVE VOLTAGE GENERATION SYSTEM

SUMMARY

Various embodiments of the present disclosure are generally directed to data storage devices, and more particularly to the adaptive generation of voltages for components of such devices.

In some embodiments, an apparatus includes a data transducer adjacent a rotatable magnetic recording medium, the data transducer having a write coil and an electromagnetic source for thermally assisted recording by the write coil. A preamplifier/driver circuit (preamp) has a write driver adapted to supply write currents to the write coil and a source driver adapted to supply source voltage to the electromagnetic source. A voltage regulation circuit applies a first positive supply voltage to the write driver and a different, second positive supply voltage to the source driver.

In other embodiments, a data storage device includes a head-disc assembly (HDA) having an environmentally controlled enclosure in which is disposed a rotatable magnetic data recording medium, a data transducer adjacent the medium, a voice coil motor (VCM) for moving the data transducer with respect to the medium, a spindle motor for rotating the medium, and a preamp for supplying and receiving signals with the transducer. The data transducer has a write coil and an electromagnetic source for thermally assisted recording by the write coil. The preamp has a write driver adapted to supply write currents to the write coil and a source driver adapted to supply source voltage to the electromagnetic source. A printed circuit board assembly (PCBA) is affixed to the HDA and has a controller and a voltage regulation circuit. The controller controls a transfer of data between the medium and a host device. The voltage regulation circuit supplies a first positive rail voltage to the write driver and a second positive rail voltage, less than the first positive supply voltage, to the source driver.

In still further embodiments, a data storage device has a data transducer adjacent a rotatable magnetic recording medium. The data transducer has a write coil and a laser diode for thermally assisted recording by the write coil. A preamp has a write driver adapted to supply write currents to the write coil and a laser driver adapted to supply source voltage to the laser diode. A voltage regulation circuit supplies a first positive rail voltage to the write driver and a second positive rail voltage, less than the first positive supply voltage, to the laser driver.

These and other features that may characterize various embodiments can be understood in view of the following detailed discussion and the accompanying drawings.

DETAILED DESCRIPTION

Figure 1:
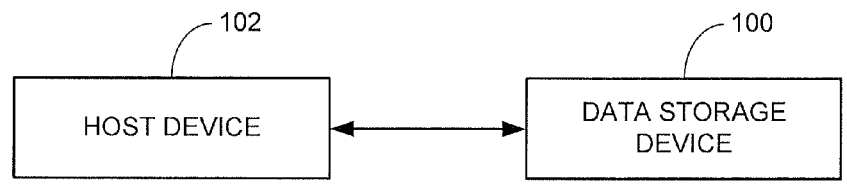
FIG. 1 provides a functional block representation of a data storage device arranged to communicate with a host device in accordance with various embodiments.

Some data storage devices use a preamplifier/driver circuit (preamp) to provide various signals to one or more read/write transducers (recording heads) supported adjacent rotatable magnetic recording media. Depending on the construction of the transducer, a preamp may include write driver circuitry for a writer coil, a read amplifier to recover readback signals from a read sensor, fly height sensor circuitry to sense the spacing between the transducer and the medium, laser diode driver circuitry for a laser diode or other electromagnetic radiation source used to support thermally assisted magnetic recording, and a photo amplifier for sensing the laser diode output power. Other circuits may be incorporated into a preamp as well, such as multiplexer (mux) circuitry to enable selection among multiple transducers connected in parallel to the preamp, heater driver circuitry to drive one or more heaters or other fly height adjustment mechanisms of the transducer, etc.

Preamps are usually supplied with a set of standard positive and negative input supply voltages, such as nominally +5V and −3V. The positive voltage may be supplied from a host device (e.g., from the power supply of a host computer, a server, a disk array, etc.), in which case the positive voltage is passed on through to the preamp after the application of signal conditioning. The data storage device usually does not receive a negative voltage from the host device, so any required negative voltages may be generated "on board" by the data storage device. A DC-DC converter can be used to generate the negative voltage, e.g., −3V or some other value.

While operable, a limitation associated with providing fixed input supply voltages to a preamp relates to the actual power requirements of the operative elements in the transducer(s) connected to the preamp. For example, a heat assisted magnetic recording (HAMR) laser diode may have a forward voltage drop of only nominally +2V. The laser diode driver in the preamp may supply slightly more than this amount, such as nominally +2.1V, in order to forward-bias the laser diode and generate the desired output current through the diode. The preamp may use linear regulation from the +5V input supply voltage, meaning that the remaining voltage drop of nominally +2.9V may be dissipated within the body of the preamp as heat. Similar line regulation losses can be encountered for other types of operative elements within the transducer, such as heaters, photodiodes, thermistors, etc.

As will be appreciated, dissipating significant amounts of heat can undesirably raise the temperature of the preamp and other adjacent components within the device enclosure. Operating at elevated temperatures can reduce the operational life of the components and alter parametric performance of the device.

Accordingly, various embodiments of the present disclosure are generally directed to an apparatus for adaptively generating and distributing voltages within a data storage device. As explained below, some embodiments are directed to a data storage device having a data transducer adjacent a rotatable magnetic recording medium. The data transducer at least includes a write coil and an electromagnetic source for thermally assisted recording with the write coil. A preamplifier/driver circuit (preamp) has a write driver adapted to supply write currents to the write coil and a source driver adapted to supply source voltage to the electromagnetic source. A power supply circuit supplies a first positive voltage to the write driver and a second positive voltage, less than the first positive supply voltage, to the source driver.

In some cases, the first positive voltage may be nominally +5V and the second voltage may be nominally +2.5V, although other voltage levels can be used. The first positive voltage can be supplied by a host device coupled to the storage device, and the second voltage can be generated externally, away from the preamp, for instance at the storage device's PCBA (printed circuit board assembly) or elsewhere on the preamp's flexible circuit board. The second positive voltage can be programmably adjusted as desired. The regulators for the second positive voltage can be switching voltage regulators, thereby reducing energy consumption (compared to linear regulation). In further embodiments, one or more programmably adjustable negative voltages can additionally be generated and supplied to the preamp.

These and other features of various embodiments can be understood beginning with a review of FIG. 1, which provides a simplified block diagram of a data handling system featuring a data storage device 100 coupled to a host device (host) 102. The respective storage device 100 and the host 102 can take any suitable forms. In some embodiments, the host 102 is a network accessible computing device, such as a desktop computer, a server, a drive array, a portable electronic device, a smart phone, a laptop, a tablet, a video recorder, a gaming system, etc. The storage device 100 may be incorporated into the host 102, or may be connected to the host locally or via a network to provide data storage capabilities for the host 102.

Figure 2:
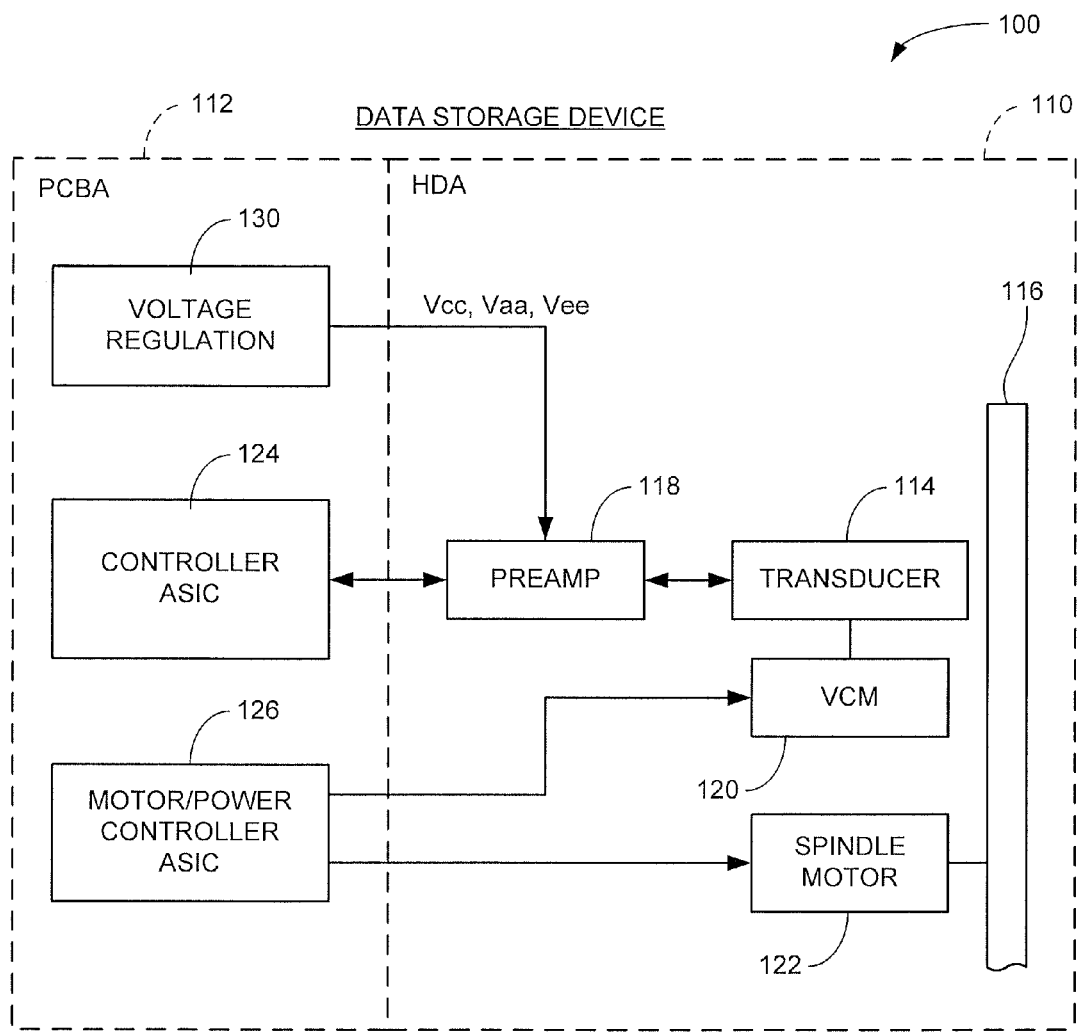
FIG. 2 shows a block diagram representation of the data storage device of FIG. 1 in accordance with some embodiments.

FIG. 2 illustrates an exemplary construction for the data storage device 100 of FIG. 1 in accordance with some embodiments. The data storage device 100 is characterized as a hard disc drive (HDD) formed from a head-disc assembly (HDA) 110 and a printed circuit board assembly (PCBA) 112. The HDA 110 generally comprises a sealed enclosure which houses various elements such as a transducer 114, a rotatable data recording medium (disc) 116, preamplifier/driver (preamp) 118, a voice coil motor (VCM) 120 and a spindle motor 122. Other elements can be used as desired. While only a single transducer 114 and medium 116 are shown, it will be appreciated that multiple transducers and media can be incorporated into the HDA 110.

The PCBA 112 supports various electrical control circuitry for the HDA 110, including a controller application specific integrated circuit (ASIC) 124, a motor/power controller ASIC 126 and a voltage regulation circuit 130. Other circuitry elements can be provided as required but such have been omitted for clarity of illustration.

The controller ASIC 124 can use a serial interface for preamp register programming. The programming allows the controller ASIC 123 to configure the preamp 118 as desired. The controller ASIC 110 also provides a write-enable signal (WREN) and interconnections for written data (write data) and read data. The motor/power controller ASIC 126 monitors voltage, generates resets, and provides drive currents to the respective VCM 120 and spindle motor 122.

Of particular interest is the voltage regulation circuit 130, which supplies respective power supply voltages Vcc, Vaa and Vee to the preamp 118. It will be appreciated that the voltage regulation circuit 130 supplies at least some of these voltages to other elements in FIG. 2 as well. While not limiting, in some embodiments the Vcc voltage is a fixed, first positive voltage such as nominally +5V, the Vaa voltage is a second programmably adaptive positive voltage such as in the range of from nominally +2V to +4V, and the Vee voltage is a negative voltage such as nominally −3V. Other values and ranges can be used.

Figure 3:
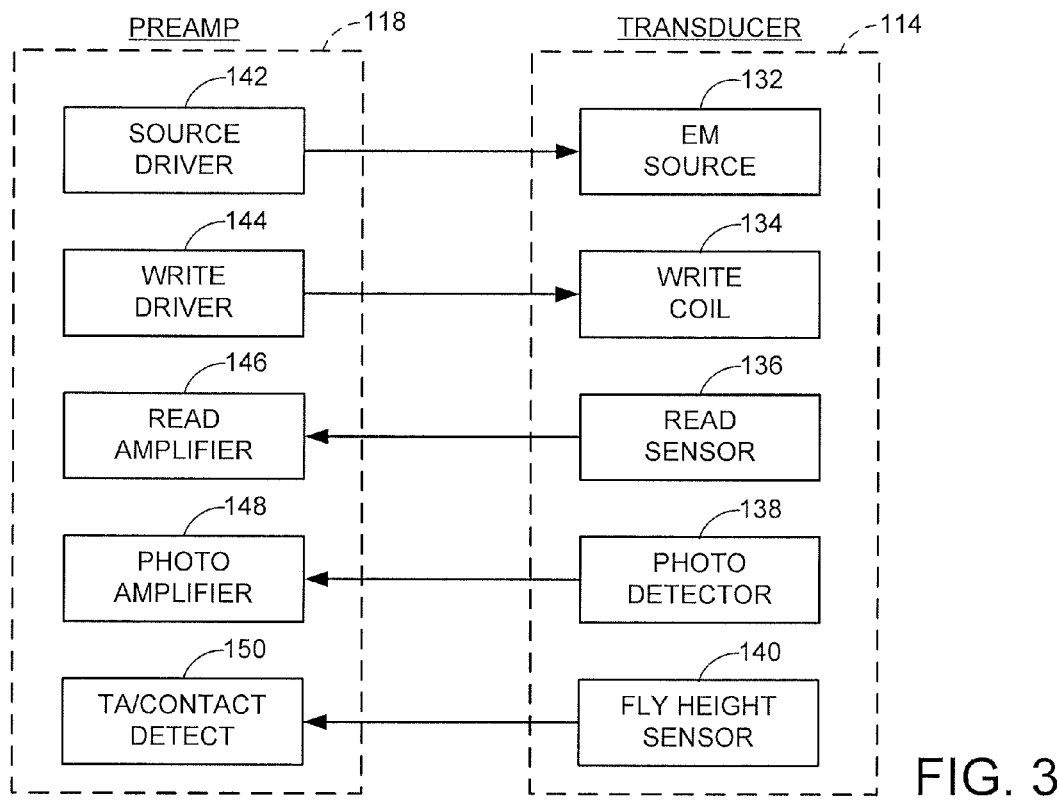
FIG. 3 shows another block diagram representation of the data storage device of FIG. 1 in accordance with some embodiments.

FIG. 3 shows an exemplary construction of the data storage device 100 focusing on the interaction between the transducer 114 and the preamp 118. Intervening mux circuitry (not shown) can be used to provide selection logic to access other transducers in the device 100.

The transducer 114 includes an electromagnetic source 132, a write coil 134, a read sensor 136, a photo detector 138 and a fly height sensor 140. The electromagnetic source 132 generates electromagnetic energy in a thermally assisted magnetic recording system, such as a heat-assisted magnetic recording (HAMR) system, in which a localized spot on the medium 116 (FIG. 2) is heated to assist in writing data to the magnetic recording medium. The heat applied by the electromagnetic source 132 changes the magnetic properties, e.g., magnetic coercivity, of the medium to make writing data to the medium easier. For purposes of the present discussion, the electromagnetic source 132 will be contemplated as comprising a laser diode, although other forms can be used including a microwave source for microwave assisted magnetic recording (MAMR).

The write coil 134 is adapted to magnetize the magnetic recording media for writing data to the media, and may take the form of a perpendicular magnetic recording element. The read sensor 136 is adapted for recovering recorded data from the magnetic recording medium and may take a magneto-resistive (MR) construction. The photo detector 138 is adapted for sensing output power of the electromagnetic source 132, and the fly height sensor 140 is adapted for sensing a clearance distance (fly height) between the transducer 114 and the magnetic recording medium 116.

The preamp 118 includes a source driver circuit 142 for driving the electromagnetic source 132, a differential transconductance writer driver circuit 144 for driving the writer coil 134 with a programmable current level, a read amplifier 146 for processing readback signals from the read sensor 136, a photo amplifier (amp) 148 for processing detection signals from the photo detector 138, and a thermal asperity (TA)/contact detection circuit 150 for processing fly height signals from sensor 140. Other configurations are envisioned, including configurations that omit one or more of these elements, configurations that use multiple ones of these elements (e.g., a multi-read sensor transducer, etc.), configurations that include additional elements such as heaters or other fly height adjustment mechanisms, microactuators, etc. Suitable electrical supply power is applied to the various preamp components and transducer components as discussed below.

Figure 4:
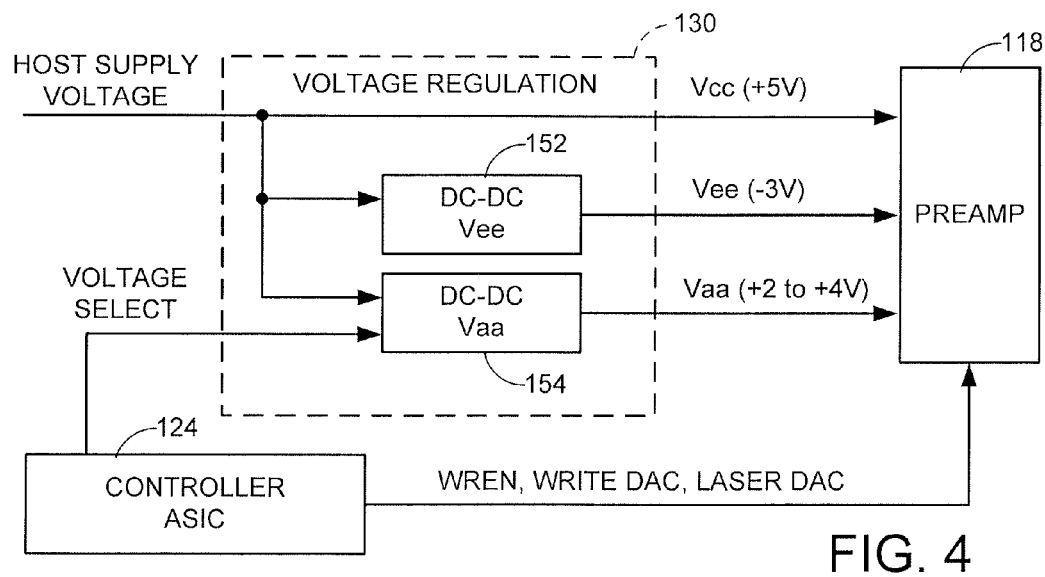
FIG. 4 is a schematic depiction of voltage regulation in the data storage device of FIG. 1 in accordance with some embodiments.

FIG. 4 illustrates an exemplary construction of relevant aspects of the voltage regulation circuit 130 of FIG. 2 in conjunction with the preamp 118 and controller ASIC 124. The preamp 118 receives the positive supply voltage Vcc and the negative supply voltage Vee for operation of its internal circuitry. It is common for the positive Vcc voltage to be provided, with appropriate regulation, from the +5V input provided from the host 102 (FIG. 1). Because the data storage device 100 typically only receives positive voltage from the host 102 (e.g., +5V, +12V), the negative Vee voltage is generated using the voltage regulation circuit 130, such as through a DC-DC converter 152 which converts the input regulated +5V to the output −3V as shown.

The second positive supply voltage Vaa is supplied by a programmable DC-DC converter 154, which uses the input regulated +5V to output an appropriate voltage over a suitable range such as nominally +2V to +4V. The voltage of the second positive supply voltage Vaa is selected in response to a control input from the controller ASIC 124, for instance over an I2C communication bus. The controller ASIC 124 further supplies a number of control inputs to the preamp 118, such as a write enable (WREN) signal, a write current DAC (digital to analog converter) value, a laser current DAC value, etc.

The DC-DC converters 152, 154 may take any suitable form such as switching regulators or linear regulators. In further embodiments, programmable negative DC-DC converters are incorporated into the voltage regulation circuit 130 to output additional negative source voltages, including programmable negative source voltages.

Figure 5:
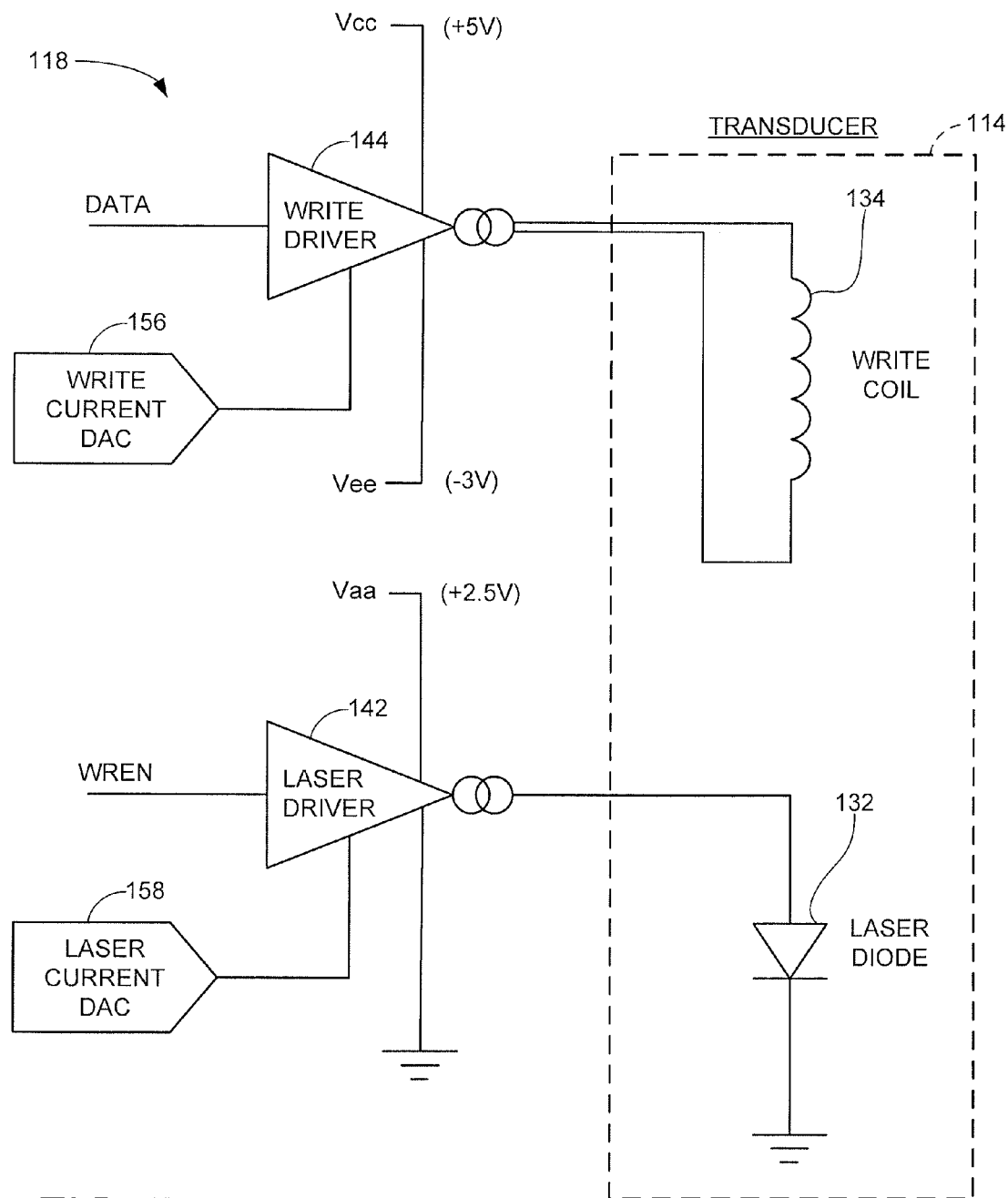
FIG. 5 illustrates an exemplary preamplifier circuitry in accordance with some embodiments.

FIG. 5 shows aspects of the preamp 118 and transducer 114 in accordance with some embodiments. The write driver 144 from FIG. 3 receives a modulated data input signal (data). The write current DAC value, expressed in digital form, is converted using suitable DAC circuitry (see block 156) to an analog input value which establishes the peak-to-peak magnitude of the output write current supplied to the write coil 134.

The Vcc and Vee voltages from FIG. 4 serve as rail voltages for the write driver 144. It will be appreciated by those skilled in the art that rail voltages serve to establish uppermost and lowermost voltage output levels for the output signal from the write driver. The actual magnitude of the output level will be established by the input DAC value; a maximum DAC value will generally correspond to the output level approaching or nominally equaling the magnitudes of the rail voltages.

As further shown in FIG. 5, the electromagnetic source (laser) driver 142 from FIG. 3 receives the write gate enable (WREN) signal as an input, with a current level established by the laser current DAC value (see block 158) and rail voltages Vaa and Ground. The laser driver 142 outputs current that forward biases the EM source, characterized as a laser diode 132 in FIG. 5.

The lower positive rail voltage Vaa can be used by the laser driver 142 instead of the higher positive rail voltage Vcc since only a relatively low forward voltage, such as about +2V, is required to place the laser diode 132 in a conductive state. Since waste heat to drop from Vcc to Vaa is carried out externally on the PCBA 112 (FIG. 2) by way of the voltage regulation circuit 130, the total amount of voltage reduction and corresponding waste heat generation by the laser driver 142 are reduced significantly.

The Vaa source voltage is routed to the preamp 118 either as a separate voltage rail (as shown) or in place of the Vcc voltage. The Vaa voltage may be used in place of the Vcc voltage for powering circuitry within the preamp 118 or elsewhere in the storage device 100. The Vaa voltage magnitude may be programmably selected to different levels for different heads, temperatures or other operating conditions.

Figure 6:
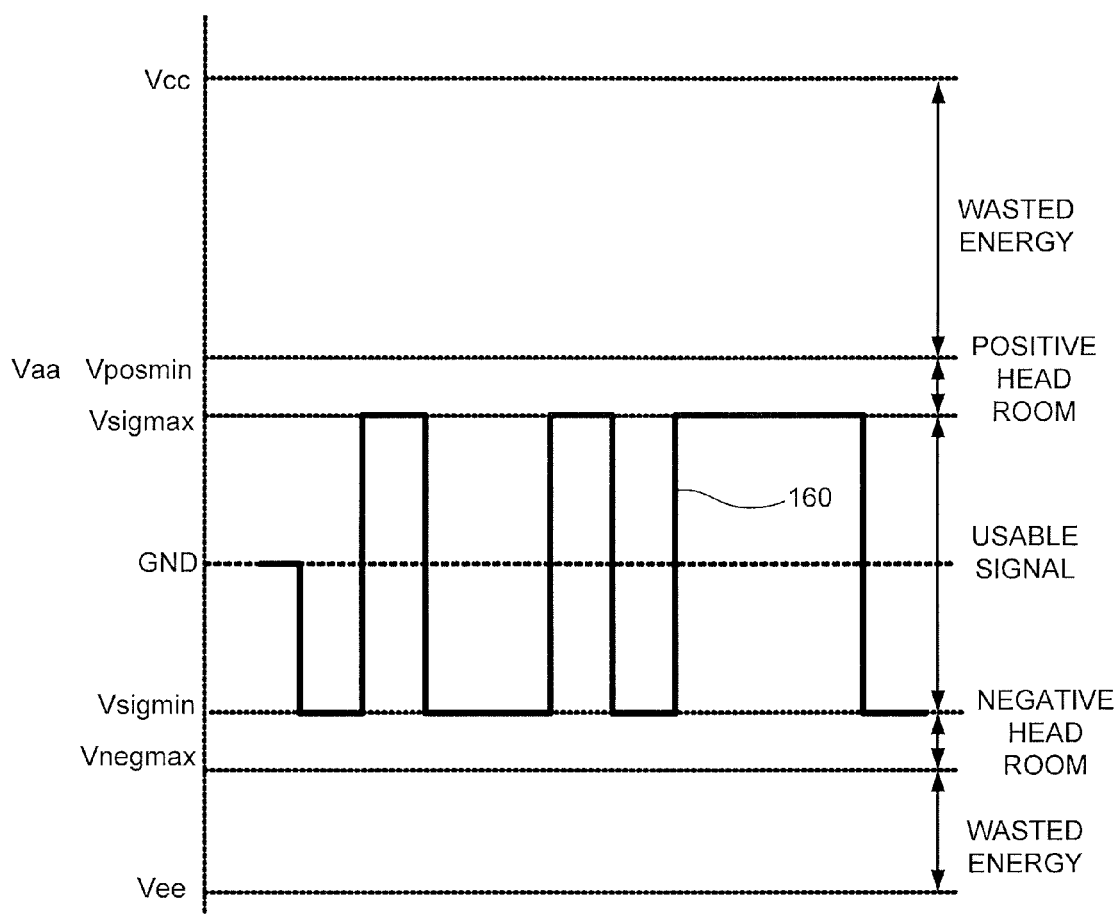
FIG. 6 shows power utilization in accordance with some embodiments.

FIG. 6 shows various voltages in the preamp 118 in accordance with some embodiments to illustrate that improvements in operation can be realized by adjusting both positive and negative rail voltages. A time-varying, bi-directional output signal is represented by curve 160. This signal can be any suitable signal output by the preamp 118, such as but not limited to a write driver signal input to the write coil 134. Alternately, in a similar manner, a time-varying, single-ended signal (i.e. one between Vsigmax and ground) can also benefit by the lower positive supply voltage.

Vsigmax represents the maximum positive range of the output signal, and Vnegmax represents the maximum negative range of the output signal. A usable signal range exists between the Vsigmax and the Vnegmax levels. For proper linear operation of the preamp driver circuitry, (see FIG. 5) a positive headroom gap is required between Vaa (also known herein as Vposmin or positive minimum voltage) and Vsigmax. Similarly, a negative headroom gap is required between Vee and Vnegmax. The additional voltage margins between Vposmin and Vcc and between Vnegmax and Vee can be viewed as unnecessary leading to potentially unwanted and undesirable heat and wasted energy.

From the foregoing discussion, supplying multiple different positive voltages to the preamp can promote enhanced efficiencies. A preamplifier design may still require higher voltage for drivers for certain other head components, such as read driver, write driver, etc. so any number of fixed and programmable positive and negative source voltages can be supplied as required. The approach disclosed may reduce a significant amount of heat and wasted energy in the preamp, and improve associated reliability and operative concerns in the preamplifier by decreasing temperature in the preamplifier.

The new, second positive voltage disclosed may be a rail voltage for the source driver or may be used in some other fashion by the preamp circuitry. The source driver can be commanded to output different power levels for different recording environments, such as different heads, locations, temperature, etc. This control can be done in a variety of ways, including through pulse width modulation or through reduced output lower than the rail voltage.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a data transducer adjacent a rotatable magnetic recording medium, the data transducer comprising a write coil and an electromagnetic source for thermally assisted recording by the write coil;
a preamp comprising a write driver adapted to supply write currents to the write coil and a source driver adapted to supply source voltage to the electromagnetic source; and
a voltage regulation circuit adapted to apply a first positive supply voltage to the write driver and a different, second positive supply voltage to the source driver.

2. The apparatus of claim 1, wherein the electromagnetic source is a laser diode and the source driver is a laser current source.

3. The apparatus of claim 1, wherein the voltage regulation circuit further applies a negative supply voltage to the preamp.

4. The apparatus of claim 1, wherein the first positive supply voltage is a positive rail voltage for the write driver and the second positive supply voltage is a positive rail voltage for the source driver, the first positive supply voltage being greater than the second positive supply voltage.

5. The apparatus of claim 1, wherein the second positive voltage is generated by a programmable DC-DC converter of the voltage regulation circuit that outputs the second positive supply voltage with a magnitude within a predetermined range less than the first positive supply voltage.

6. The apparatus of claim 5, wherein the DC-DC converter is a switching regulator.

7. The apparatus of claim 5, wherein the DC-DC converter is a linear regulator.

8. The apparatus of claim 5, wherein the second positive supply voltage is programmably adjusted responsive to a control input from a controller to a selected level responsive to a parametric measurement associated with the transducer.

9. The apparatus of claim 1, wherein the second supply voltage is programmably adjusted responsive to operational conditions.

10. The apparatus of claim 1, wherein the data transducer further comprises a read sensor for recovering data previously written to the rotatable magnetic recording medium, the preamp further comprises a read amplifier adapted to condition readback signals from the read sensor, and the voltage regulation circuit supplies the second positive supply voltage as a positive rail voltage to the read amplifier.

11. The apparatus of claim 1, wherein the data transducer further comprises a proximity sensor for detecting space between the data transducer and the rotatable magnetic recording medium, the preamp further comprises a proximity sensor amplifier adapted to condition proximity sensor signals from the proximity sensor, and the voltage regulation circuit supplies the second positive supply voltage as a positive rail voltage to the proximity sensor driver.

12. The apparatus of claim 1, wherein the first positive supply voltage is nominally +5V, and the second positive supply voltage is nominally +2.5V.

13. A data storage device comprising:
a head-disc assembly (HDA) having an environmentally controlled enclosure in which is disposed a rotatable magnetic data recording medium, a data transducer adjacent the medium, a voice coil motor (VCM) for moving the data transducer with respect to the medium, a spindle motor for rotating the medium, and a preamp for supplying signals to the transducer, the data transducer comprising a write coil and an electromagnetic source for thermally assisted recording by the write coil, the preamp comprising a write driver adapted to supply write currents to the write coil and a source driver adapted to supply source voltage to the electromagnetic source; and
a printed circuit board assembly (PCBA) affixed to the HDA comprising a controller to control a transfer of data between the medium and a host device, and a voltage regulation circuit which supplies a first positive rail voltage to the write driver and a second positive rail voltage, less than the first positive rail voltage, to the source driver.

14. The data storage device of claim 13, wherein the magnitude of the second positive rail voltage is programmably selected from within a predetermined range responsive to a control selection input from the controller.

15. The data storage device of claim 13, wherein the voltage regulation circuit further supplies a negative rail voltage to each of the write driver and the source driver.

16. The data storage device of claim 13, wherein the voltage regulation circuit supplies a first negative rail voltage to the write driver and a second, different negative rail voltage to the source driver.

17. The data storage device of claim 13, wherein the second positive rail voltage is programmably adjusted by the controller responsive to environmental conditions.

18. The data storage device of claim 13, wherein the second positive rail voltage is programmably adjusted by the controller responsive to operational conditions.

19. A data storage device comprising:
a data transducer adjacent a rotatable magnetic recording medium, the data
transducer comprising a write coil and a laser diode for thermally assisted recording by the write coil;
a preamp comprising a write driver adapted to supply write currents to the write coil
and a laser driver adapted to supply source voltage to the laser diode; and a voltage regulation circuit which supplies a first positive rail voltage to the write
driver and a second positive rail voltage, less than the first positive rail voltage, to the laser driver.

20. The data storage device of claim 19, wherein the voltage regulation circuit further supplies a negative rail voltage to both the write driver and the laser driver.

* * * * *